US006766356B1

(12) United States Patent
Krautter (10) Patent No.: US 6,766,356 B1
(45) Date of Patent: Jul. 20, 2004

(54) METHOD AND SYSTEM FOR REMOTELY MODIFYING PRESENTATIONS IN A MULTIMEDIA CONFERENCE

(75) Inventor: Arno Krautter, Hamilton (CA)

(73) Assignee: Genesys Conferencing, Ltd., Toronto (CA)

( * ) Notice: Subject to any disclaimer, the term of this patent is extended or adjusted under 35 U.S.C. 154(b) by 647 days.

(21) Appl. No.: 09/661,482

(22) Filed: Sep. 14, 2000

(51) Int. Cl.[7] .............................................. G06F 15/16
(52) U.S. Cl. ...................... 709/204; 709/205; 709/230
(58) Field of Search ............................... 709/204, 205, 709/248, 330

(56) References Cited

U.S. PATENT DOCUMENTS

| 5,446,842 A | * | 8/1995 | Schaeffer et al. | 709/205 |
| 5,802,299 A | * | 9/1998 | Logan et al. | 709/218 |
| 5,944,791 A | | 8/1999 | Scherpbier | |
| 5,951,652 A | * | 9/1999 | Ingrassia et al. | 709/248 |
| 6,446,113 B1 | * | 9/2002 | Ozzie et al. | 709/204 |
| 6,463,461 B1 | | 10/2002 | Hanson et al. | |
| 6,487,607 B1 | | 11/2002 | Wollrath et al. | |
| 6,523,063 B1 | | 2/2003 | Miller et al. | |

FOREIGN PATENT DOCUMENTS

EP 0 874 323 A1 10/1998

OTHER PUBLICATIONS

PCT Written Opinion for PCT Ser. No. US01/28904, mailed May 12, 2003 (6 pgs.).
Jacobs, S.; Gebhardt, M.; Kethers, S.; & Rzasa, W. "Filling HTML forms simultaneously: CoWeb—architecture and functionality," *Computer Networks and ISDN Systems,* 28:11 (May 1, 1996), pp. 1385–1395.
Souya, T.; Kobayashi, M.; Kawase, S.; & Ohshima, K. "Joint class experiments based on realtime web–browser synchronization," *Computer Human Interaction, 1998 Proceedings, IEEE* (Jul. 15, 1998), pp. 367–372.

PCT International Search Report for PCT Appln. No. US01/28904, mailed Feb. 11, 2003 (7 pages).

* cited by examiner

*Primary Examiner*—Frantz B. Jean
(74) *Attorney, Agent, or Firm*—Blakely, Sokoloff, Taylor & Zafman LLP (57) ABSTRACT

A method and system that remotely modifies presentation data in a multimedia conference. The conference moderator can remotely issue commands that change the HTML and Javascript or create new HTML or Javascript for the web page being presented to the conference participant. The moderator is changing the HTML and Javascript displayed in the conference participant's browser window, by remote control. The HTML and Javascript in the participant's presentation data is changed so that the participant views what the moderator directs. This is not predetermined, but can be changed by the moderator at any time. Through the use of a presentation Java applet, the moderator of a conference is able to place annotation commands into the empty annotation containers of a conference participant's annotation shell page. The moderator chooses annotation commands for the containers and then transmits the commands to a viewing Java applet at the participant's DPS. The viewing Java applet places the annotation commands in the annotation containers of the annotation shell page of the participant DPS. The HTML and Javascript of the presentation data is thereby modified.

42 Claims, 10 Drawing Sheets

WEP PAGE ANNOTATION
OVERLAY

METHOD AND SYSTEM FOR REMOTELY MODIFYING PRESENTATIONS IN A MULTIMEDIA CONFERENCE

FIELD OF THE INVENTION

The present invention relates generally to multimedia conferencing, and more particularly to a method and system for remotely modifying presentations in a multimedia conference.

INTRODUCTION AND BACKGROUND

Figure 1:
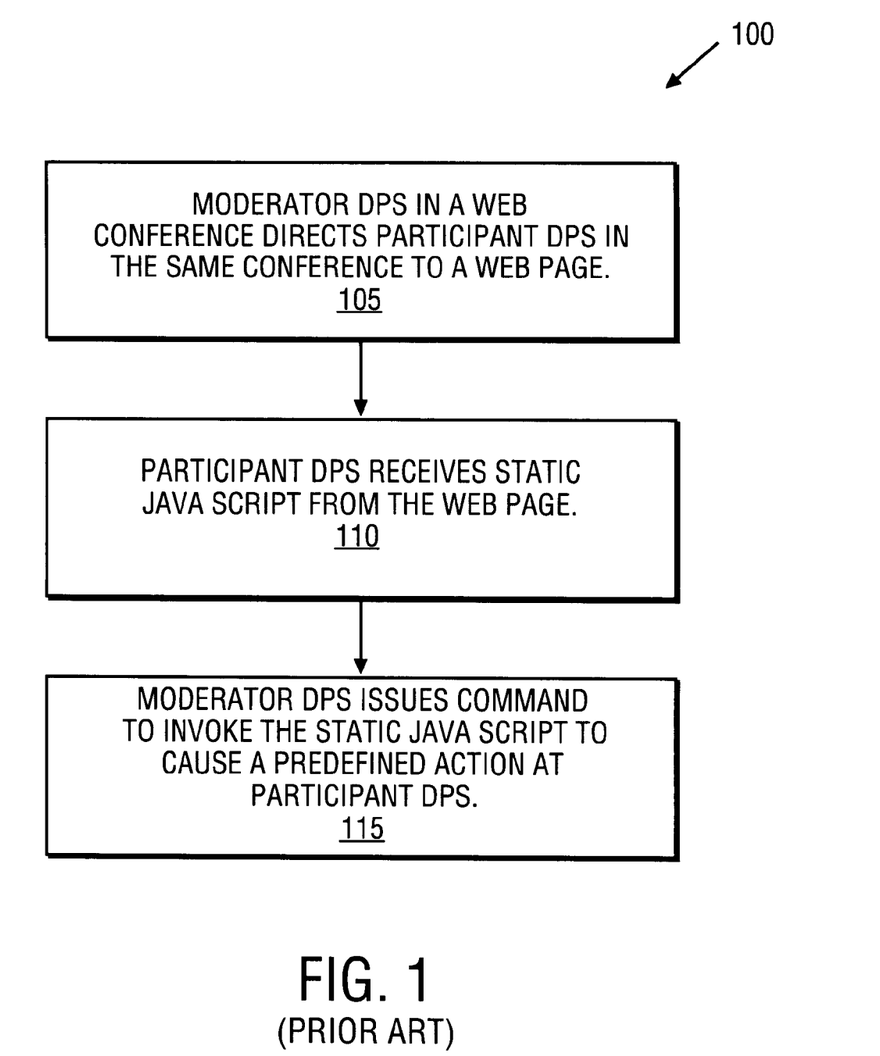
FIG. 1 is a flow chart showing the prior art process of the transmission of data to a participant DPS in a multimedia conferencing system.
Figure 2:
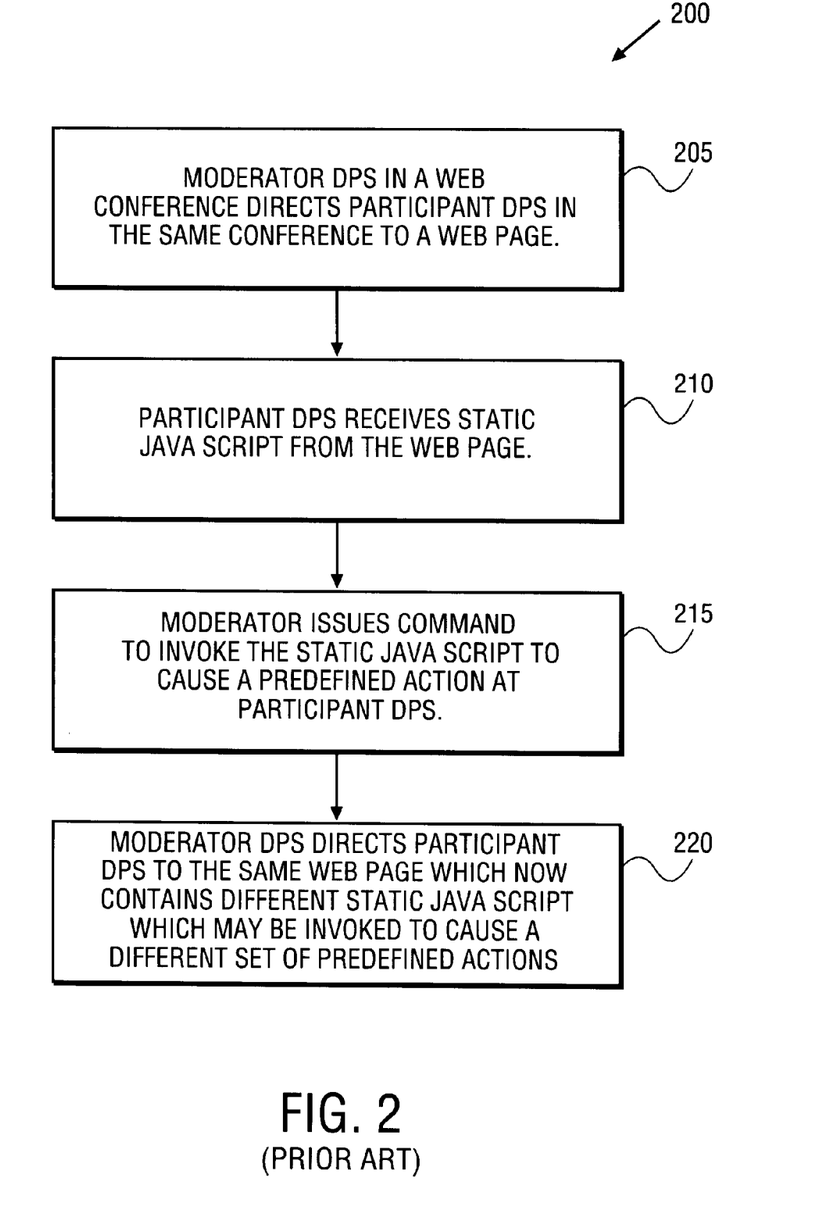
FIG. 2 is a flow chart showing the prior art process of changing the presentation of a multimedia conference by transmitting a new web page.

Use of internet-related networks (e.g. the World Wide Web) for multi-media conferencing presentations has increased dramatically in recent years. A conference participant may direct another participant to information stored on a computer network (e.g. web pages). U.S. Pat. No. 5,944,791 describes an example of a presentation using the web. To facilitate the conference it is desirable for a conference participant (e.g., a conference moderator) to be able to initiate and direct other participants' receipt of such information (so-called collaborative web browsing). To do this, the moderator must send command data, such as uniform resource locator (URL) data to other participants' digital processing system (DPS) to direct the other participants to a particular web page. The web page may contain embedded Javascript that causes the display of the web page to be modified in a predetermined way. For example, the embedded Javascript could contain a timeline that allows the conference participants to view some of the information on the web page and after some time view additional or different information of the same web page. The Javascript is downloaded with the hypertext markup language (HTML), not necessarily embedded with it. A library of Javascript is downloaded to the participant DPS's cache memory. The moderator can then access the Javascript necessary to cause a predefined desired action, and cause that Javascript to be embedded into a web page which a participant is viewing. FIG. 1 shows a method by which the moderator causes the modification of a displayed web page of a participant. The method 100 of FIG. 1 begins with operation 105, in which a moderator DPS in a web conference directs a participant to a web page. In operation 110 the participant is directed to a web page and receives a library of Javascript along with the HTML. In operation 115 the moderator issues commands that invoke the Javascript received at the participant's DPS. This Javascript causes a predefined action such as a further portion of the display becoming visible or an icon appearing. The Javascript is considered static in that once the HTML and Javascript are downloaded for a given web page the associated library of Javascript cannot be modified. The moderator can invoke selected Javascript from the library to cause desired actions on the display of the participant, but the moderator cannot change the library of available Javascript. The moderator of a web conference may direct a participant to a web page and then wish to modify what the participant is viewing beyond the Javascript transmitted with the HTML page. Currently, one way to do this would be to retransmit the web page with different embedded Javascript (i.e. a new web page). This method is depicted in FIG. 2. The method 200 depicted in FIG. 2 begins at operation 205 in which the moderator of a web conference directs a participant of the same web conference to a web page. In operation 210 the participant receives the static Javascript from the web page. This static Javascript is invoked by the moderator in operation 215 to cause predefined actions at the participant's DPS. This process would have a detrimental affect on the web conference because transmitting the new page would cause delay and a disruption of visual continuity as the participant's display screen would blank out while the new page was loaded.

Figure 3:
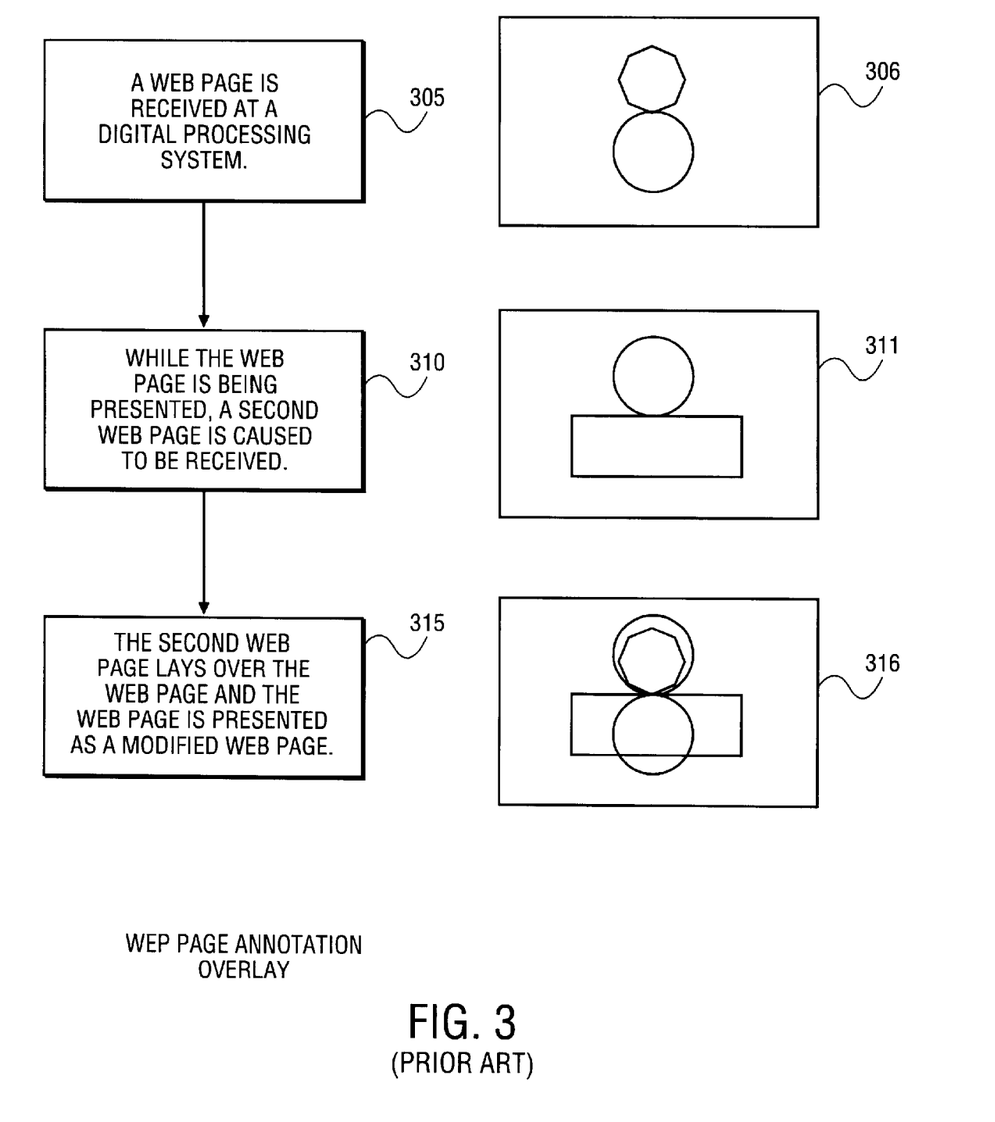
FIG. 3 is a prior art diagram of a method for annotating a web page.

Other methods of effecting a modification of a web page (e.g. mouse rollover or web page annotation overlay) are not part of an overall web conferencing scheme. The annotation overlay method of modifying a web page is depicted in FIG. 3. The method 300 begins at operation 305 in which a first web page 306 is received at a DPS. In operation 310 while the first web page 306 is being presented, a second web page 311 is caused to be received. The second web page 311 could be caused to be received by the transmitter of the first web page, by the receiver of the first web page, or by another entity. In operation 315 the second web page 311 lays over the first web page 306 and the presentation of the first web page 306 appears as modified web page 316 (i.e. the visual effect is that of modifying the first web page 306). The web page annotation over lay method depicted in FIG. 3 is analogous to placing a Post-it note on a document. In both cases the document itself is not changed, only its presentation.

For the foregoing reasons there is a need for the moderator of a web conference to be able to modify the Javascript/HTML of a web page being viewed by a remote participant without reloading the web page.

SUMMARY OF THE INVENTION

A method is described for modifying presentation information. The method is implemented on a digital processing system. Data is selected. A first digital processing system issues directive commands to at least one other digital processing system, which is remote from the first digital processing system, causing the at least one other digital processing system to present the data. The at least one other digital processing system receives modification commands such that the data is modified. The data, being presented by the at least one other digital processing system, is modified without the at least one other digital processing system receiving the directive commands again.

BRIEF DESCRIPTION OF THE DRAWINGS

These and other features, aspects, and advantages of the present invention will become better understood with regard to the following description, appended claims, and accompanying drawings where:

DETAILED DESCRIPTION

The present invention provides, in one embodiment, methods and apparatuses for remotely affecting the presentation command set of a web page being viewed by another participant of a web conference. As recognized by an embodiment of the present invention it is possible to allow the moderator of a Web conference to direct another participant in the conference to view a Web page, and later issue commands that may cause the HTML and Javascript transmitted with the web page to be modified or issue commands that create new Javascript for the web page. During the course of a web conference, one participant will present displays to a number of viewing participants where the displaying participant (e.g., a conference moderator) has control over what the viewing participants are currently seeing. The viewer's are passive in the sense that they do not directly affect their view of the presentation.

One embodiment of the present invention is implemented as a set of dynamic HTML pages with some special HTML and Javascript code embedded to allow for the the moderator to dynamically control the display of a presentation in order to allow the moderator to illustrate or reinforce certain points.

The present invention provides the ability to annotate the presentation extemporaneously. Using annotations the moderator can, for example, underline an important line of text on the presentation. Viewing participants would see this underlining in their own browser windows at precisely the same position in the current presentation slide. These annotations can work completely within the context of a browser window and can be completely implemented in terms of dynamic HTML and Javascript.

Figure 4:
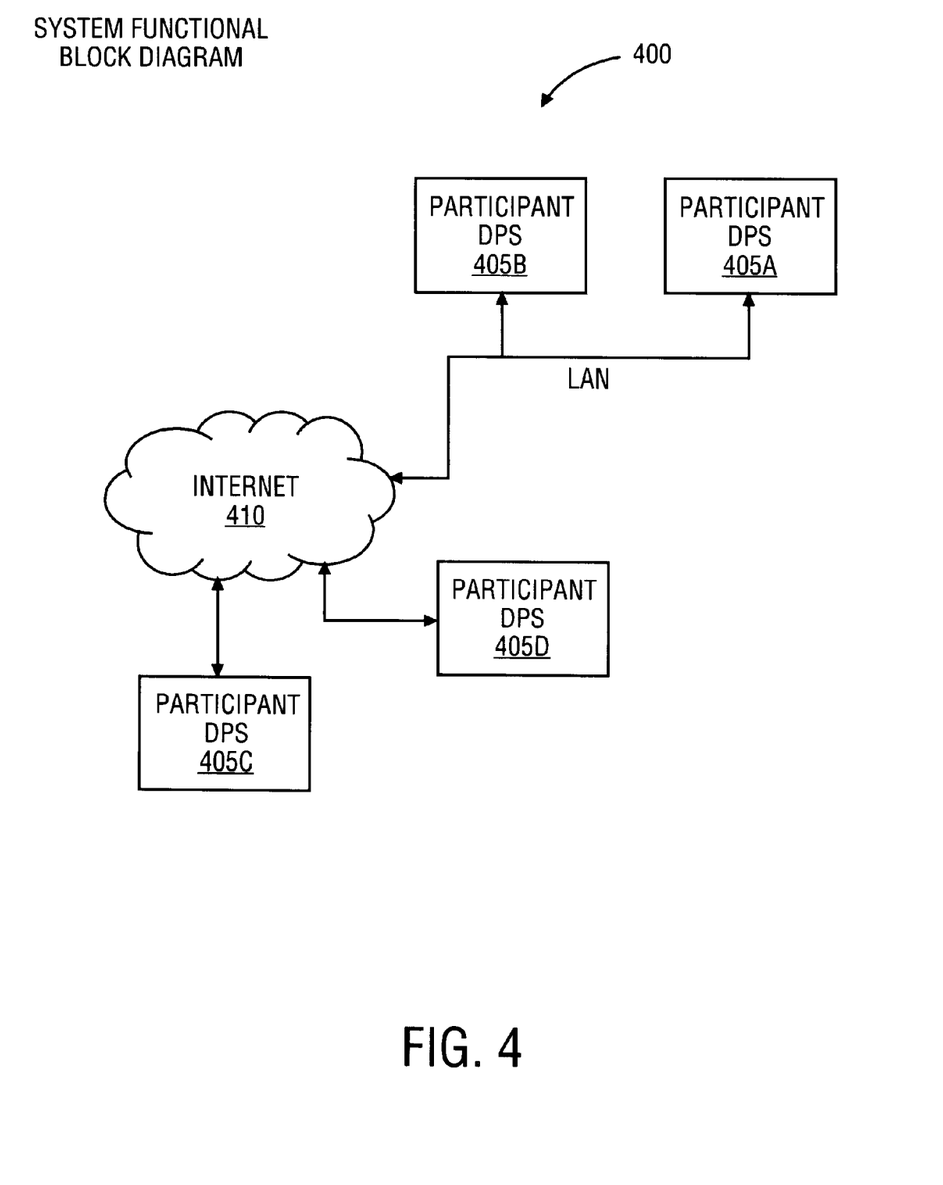
FIG. 4 is a functional block diagram of one embodiment of a system for practicing the present invention.

FIG. 4 is a diagram of a network of DPSs 400 in which data may be received and processed according to one embodiment of the present invention. It will be appreciated that the network of DPSs 400 can function as a multimedia conferencing system. As shown in FIG. 4, a plurality of local or remote participant DPSs 405a, 405b, 405c and 405d, are coupled, through Internet 410. The Internet 410 is a network of networks through which information is exchanged by methods well known to those in the art (e.g. the use of TCP and IP protocols, etc). One of the participant DPSs 405a, 405b, 405c and 405d, for example 405a, acts as a moderator and sends directive commands, through the internet, to one or more of the other participant DPSs, for example 405d, causing DPS 405d to load and present a web page and to download a presentation command set (e.g. Javascript) in the cache memory of DPS 405d. DPS 405a accesses the Javascript and causes certain desired commands of the Javascript to be executed. If there is a need to modify or add to the Javascript or HTML then DPS 405a sends commands that modify the commands of the Javascript or cause new commands to be created within the Javascript or HTML of DPS 405d. This occurs while DPS 405d is presenting the web page without the need to load another web page. Further details concerning the operation of the participant DPSs 405a, 405b, 405c and 405d are provided below.

Figure 5:
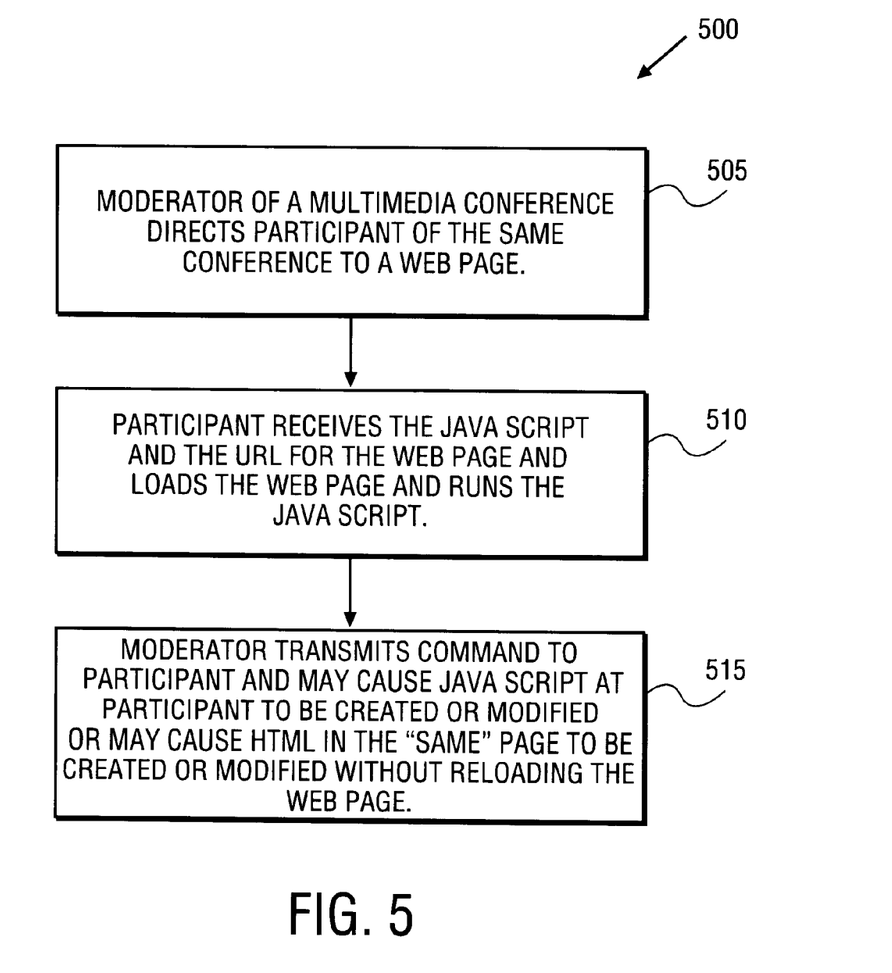
FIG. 5 is a flow chart showing a process of one embodiment of the invention.
Figure 6:
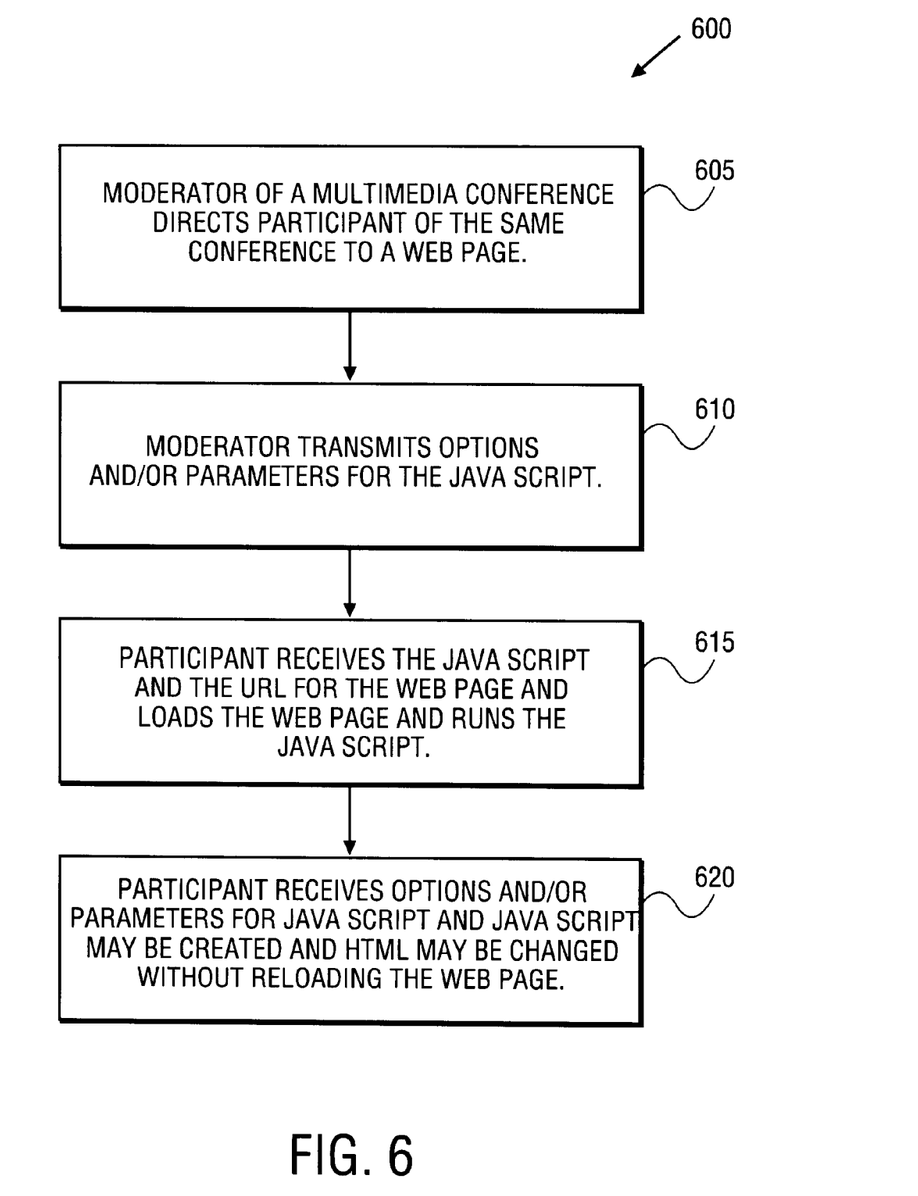
FIG. 6 is flow chart showing the process of one embodiment of the invention.
Figure 7:
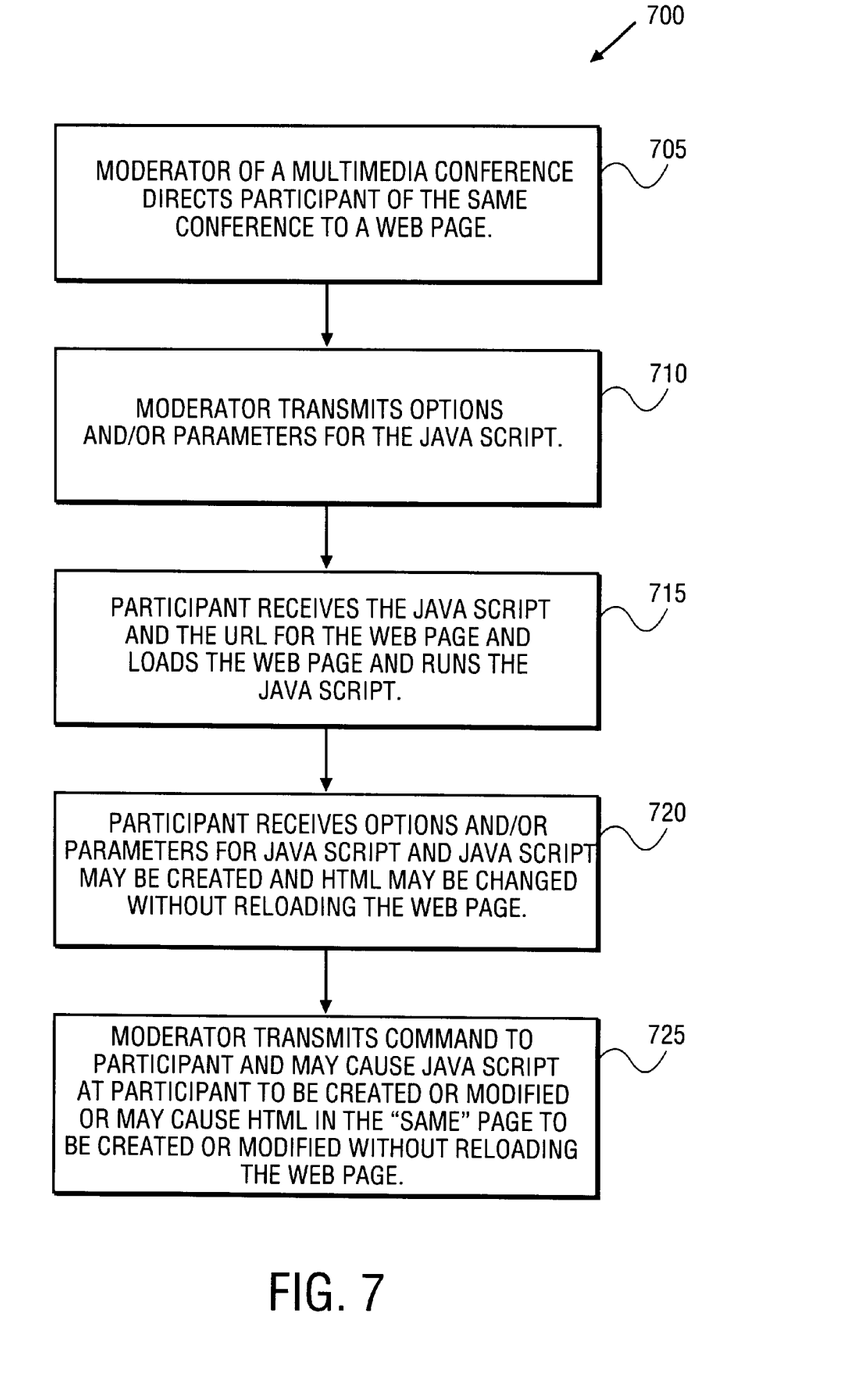
FIG. 7 is flow chart showing the process of one embodiment of the invention.

FIGS. 5, 6, and 7 are flow charts of the process of the present invention by which the Javascript or HTML is modified or new Javascript is created after the web page has been loaded and without reloading the web page at a participant DPS.

The method 500 shown in FIG. 5 begins at operation 505, in which the moderator of a web conference directs a participant of the same conference to a web page. In operation 510, the participant's DPS receives the URL and the Javascript and HTML for the web page and loads the web page and runs the Javascript and HTML. In operation 515, the moderator transmits commands to the participant, which may cause the Javascript or HTML at the participant's DPS to be created or modified and may cause HTML in the same web page to be created or modified without reloading the web page. This results in what appears as a change in the presentation of the web page without the customary reloading of the web page. This change may be considered an annotation of the web page which was initially displayed.

FIG. 6 depicts a variation of the process described above in reference to FIG. 5. The method 600 adds operation 610. In operation 605, the moderator of a web conference directs a participant of the same conference to a web page. In operation 610, the moderating participant transmits options and/or parameters to modify the Javascript or HTML or create new Javascript. The moderating participant has transmitted these modifying commands prior to the participant loading the web page, operation 615. In operation 620, the participant receives the commands that may cause the Javascript and HTML, at the participant's DPS, to be created or modified without reloading the web page.

FIG. 7 depicts another instance of the same process by which the moderator issues modifying commands before the participant has loaded the web page and issues further modifying commands while the web page is being presented.

The method 700 shown in FIG. 7 begins at operation 705, in which the moderator of a web conference directs a participant of the same conference to a web page. In operation 710, the moderator transmits commands to the participant's DPS that may cause the Javascript or HTML at the participant's DPS to be created or modified.

In operation 715, the participant receives the URL and the Javascript for the web page and loads the web page and runs the Javascript. In operation 720, the participant receives the commands, which may cause the Javascript and HTML at the participant's DPS to be created or modified without reloading the web page. In operation 725, the moderator transmits further modifying commands to the participant's DPS, which may cause further modification of the Javascript and the HTNL in the same web page.

Figure 8:
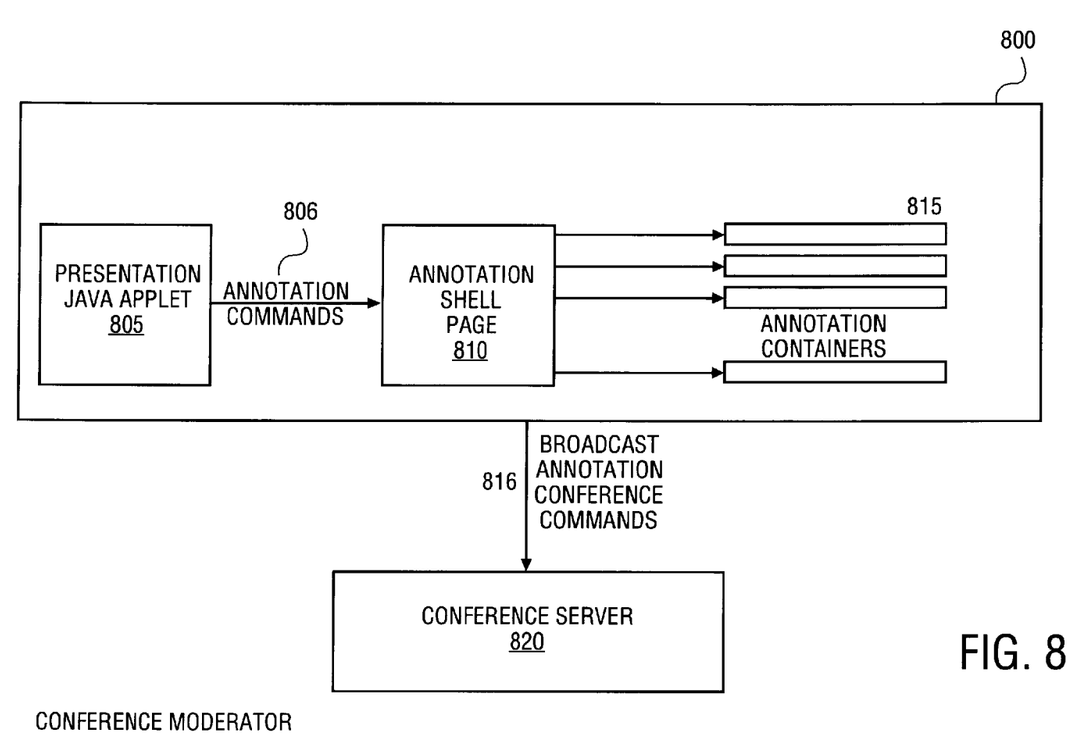
FIG. 8 is a software media diagram which includes representations of executable program instructions that may be executed by the moderator DPS.

FIG. 8 depicts the implementation of one embodiment of a conference moderator DPS of the present invention. The machine-readable media for conference moderator 800 includes a presentation Java applet 805, an annotation shell page 810, and annotation containers 815. This machine-readable media typically stores executable computer program instructions that cause a machine (e.g., server 820 also shown in FIG. 8) to perform any of the various methods of the invention.

The set of available annotation containers 815 are implemented on each presentation page at the lowest level. In Appendix A, section 1 contains an example of the code for implementing annotations, section 2 contains an example of code which allocates the annotations containers on an HTML page, and section 3 contains an example of code that picks one of the annotation containers for use. The implementation of these containers depends on the specific browser (e.g. for Netscapes's Navigator the container is based on a LAYER tag and for Microsoft's Internet Explorer the container is based on a DIV tag). Within these container tags, HTML and Javascript code is inserted as defined by commands originated by the moderator. This contained HTML code can be dynamically and arbitrarily changed by a command initiated by the conference moderator. Appendix B contains an example of the code for changing the HTML within annotation container. The containers 815 can contain many types of annotation commands, which modify the presentation in various ways. For example, in an exemplary embodiment, the containers may contain a highlighting command to emphasize some portion of the presentation, a moving command to move portions of the presentation within the web page, and a sizing command. Appendix C contains an example of the code for changing an annotation's visibility, position, and size. The containers may contain other information or commands, for example a command to add or delete text, a Java applet, or web pages.

The conference moderator 800 interacts with the user interface of the presentation Java applet 805 to choose a particular style of annotation to display to the conference viewers. For instance, the moderating participant could choose icons or highlights or other types of annotation, such as text, or even whole web pages. The moderator 800 chooses the annotation type then interactively places the annotation at the desired positions on the presentation page. In the case of the highlighting annotations, the moderator can also specify the size of the annotation. In other annotation types, the moderator may be required to enter extra data such as the text for a text annotation. While the moderator is interacting with the annotation, annotation commands 806 are sent from the presentation Java applet 805 to special routines on the presentation page. The routines implement the annotation commands 806 using a particular annotation container. Within the annotation shell page 810, when an annotation command 806 is received, specific operations are performed. If the command is a start annotation command, an available annotation container 815 is chosen and is assigned a particular annotation type supplied by the command. This is implemented by rewriting the HTML inside the annotation container with new code, which would consist of new HTML and Javascript. This describes the particular characteristics of the desired annotation. If, for example, a move annotation command is received, then the HTML will be changed within the container to affect the new desired position of the annotation. If a size annotation command is received, then the HTML within the container will be changed to affect the desired size. Similarly, other commands having other desired affects are created, such as placing text within the container, commanding the container to display a Java applet, or even a complete web page. Appendix D contains an example of the code for associating a URL with a particular annotation.

Once the moderator is satisfied with the position, the size, or the content of the annotation on his annotation shell page 810, the moderator issues a command to finish the annotation. The presentation Java applet 805 packages the complete specifications for the state and appearance of the annotations into a conference command 816 that is sent to the conference server 920. The conference server 920 is in contact with all of the viewing participants of the conference and sends a conference command 916 to each viewer to implement the particular annotations specified by the moderator. In one embodiment, the moderator has more control over the annotation process and could send annotation commands to affect the displays of several of the participants to a conference while not annotating the presentation displays to other participants in the conference.

Figure 9:
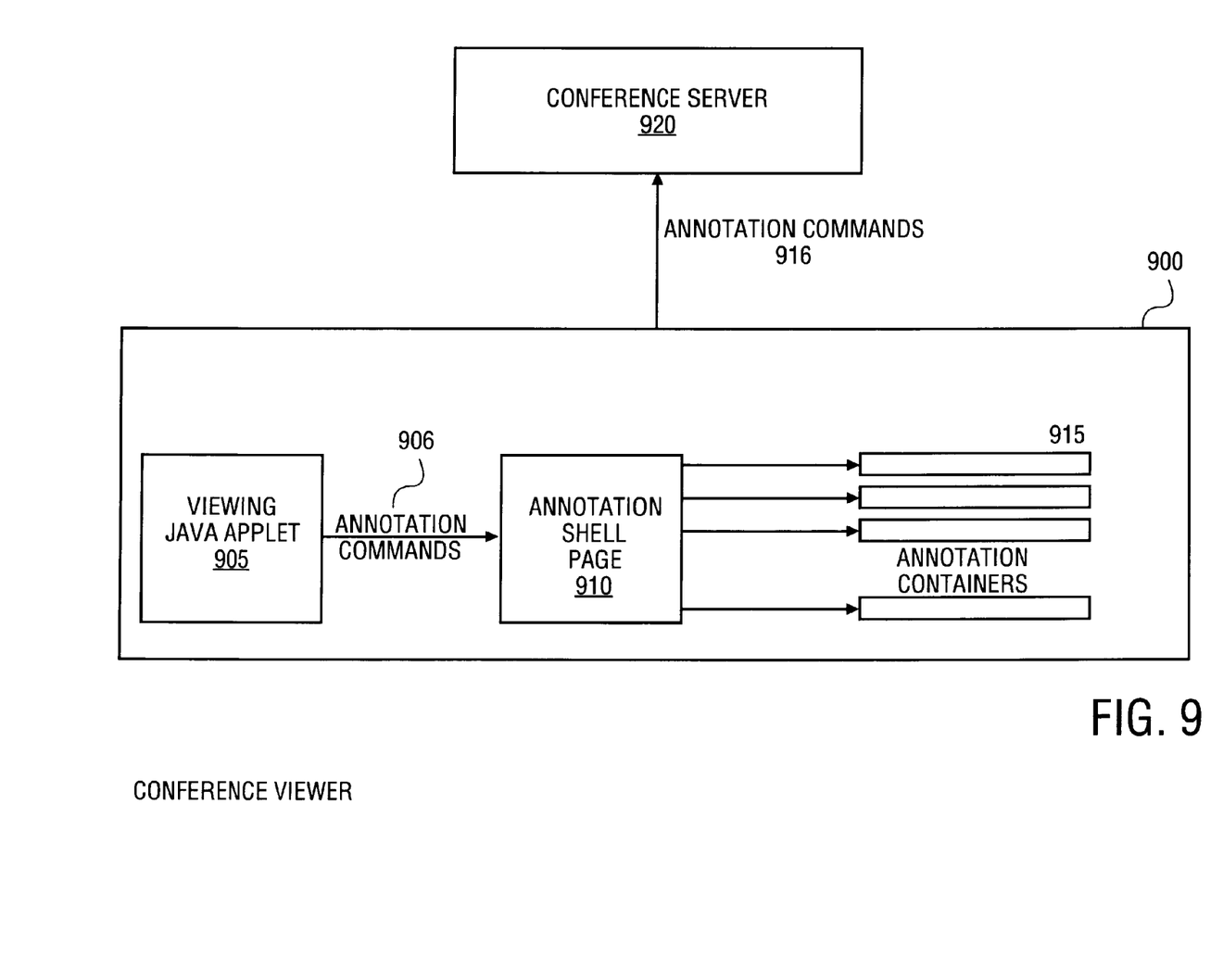
FIG. 9 is a software media diagram which includes representations of executable program instructions that may be executed by the participant DPS.

FIG. 9 depicts the implementation of one embodiment of a conference viewer DPS of the present invention. The machine-readable media for conference viewer 900 includes a viewing Java applet 905, an annotation shell page 910, and annotation containers 915. This machine-readable media typically stores executable computer program instructions that cause a machine (e.g., a participant DPS) to perform any of the various methods of the invention. Also shown in FIG. 9 is the conference server 920. The viewing Java applet 905 is able to communicate to a presentation page that contains an implementation of an annotation shell (i.e. the annotation shell page 910). The annotation shell contains several annotation containers 915 so when a viewing Java applet 905, on a participant's DPS, receives an annotation specification command 916 these specifications are issued as annotation commands 906 to the annotation shell page in a manner similar to that described above in reference to FIG. 8. The only difference is that the annotation commands 906 are not originated by the viewing participant. The commands are remotely generated by the moderating participant (i.e. the presentation Java applet 805) as described above. Within the viewing participant's annotation shell page 910, a particular annotation container is selected. This is completely independent of the annotation containers 815 selected by the moderator. The commands then cause HTML and Javascript code to be modified within the selected annotation container. The generated code exactly reflects the desired state and appearance of the annotation as specified by the moderating participant. Once the HTML and Javascript has been changed in the annotation container the browser will display the desired annotation on the viewer's presentation page.

Thus, in one embodiment of the present invention, it will be possible for multimedia conference participant to be directed to a particular web page and while the information is presented to remotely receive commands, which can modify the existing Javascript, or HTML, or cause new Javascript or HTML to be created. The modifications to the presentation are not predetermined, but can be changed by the moderator at any time. In an alternative embodiment the modification commands are not issued by the moderator, but are issued by a presenter who may be another remote conference participant.

Figure 10:
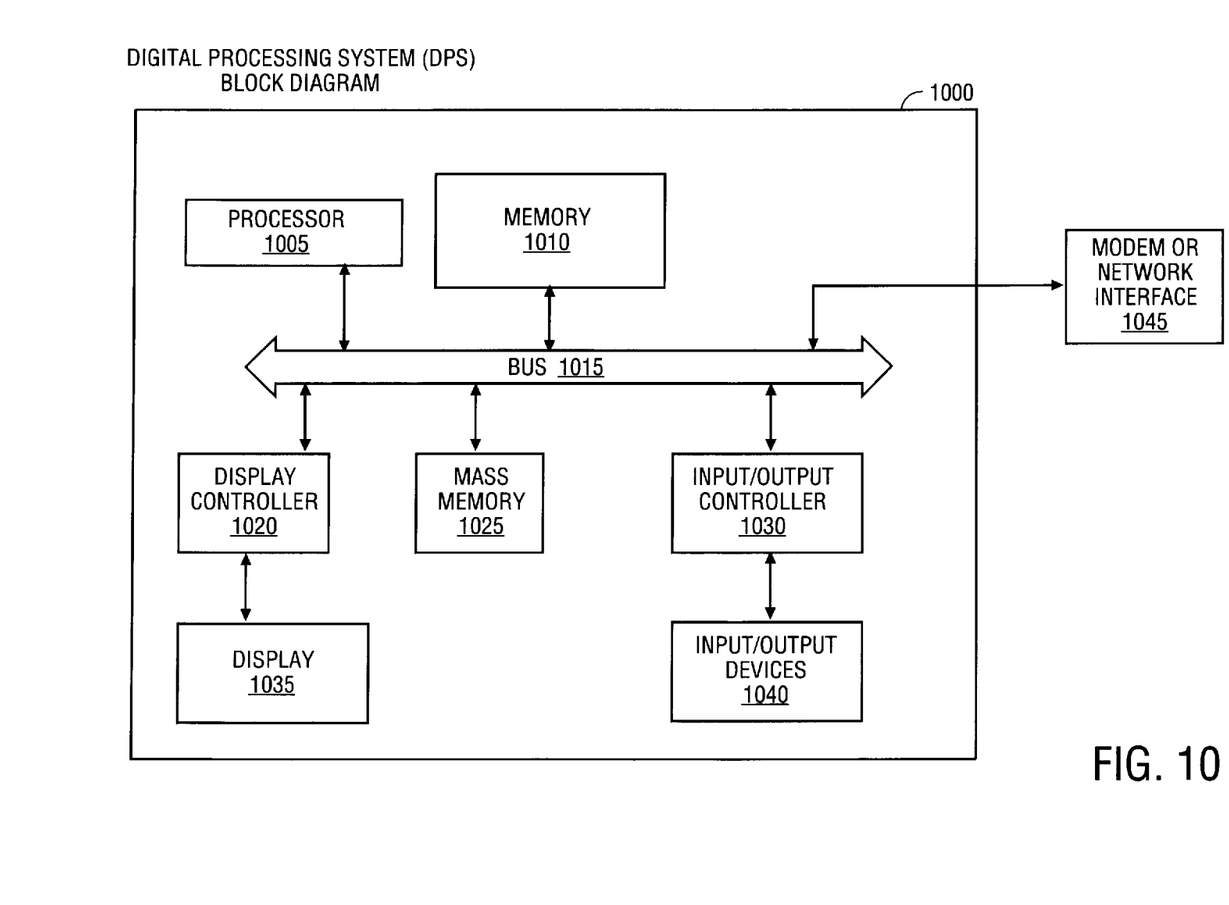
FIG. 10 is a block diagram of one embodiment of a DPS.

FIG. 10 is a block diagram of a digital processing system DPS that may be used in accordance with one embodiment of the present invention. For example, the digital processing system 1000, shown in FIG. 10, may be used as a participant DPS, or a Moderator DPS, or a server DPS, etc. Furthermore, the DPS 1000 may be used to perform one or more functions of an Internet service provider. The DPS 1000 may be interfaced to external systems through a modem or network interface 1045. The modem or network interface may be considered a part of the DPS 1000. The modem or network interface may be an analog modem, an ISDN modem, a cable modem, a token ring interface, a satellite transmission interface, a wireless interface, or other interface(s) for providing a data communication link between two or more DPSs.

The DPS 1000 includes a processor 1005, which may represent one or more processors and may include one or more conventional types of processors, such as Motorola PowerPC processor, an Intel Pentium (or x86) processor, etc. A memory 1010 is coupled to the processor 1005 by a bus 1015. The memory 1010 may be a dynamic random access memory (DRAM) an/or may include static RAM (SRAM). The processor 1005 may also be coupled to other types of storage areas/memories (e.g. cache, Flash memory, disk, etc.), that could be considered as part of the memory 1010 or separate from the memory 1010.

The bus 1015 further couples the processor 1005 to a display controller 1020, a mass memory 1025 (e.g. a hard disk or other storage which stores all or part of the components shown in the media diagrams of FIGS. 8, and 9 depending on the particular DPS), the modem or network interface 1045, and an input/output (I/O) controller 1030. The mass memory 1025 may represent a magnetic, optical, magneto-optical, tape, and/or other type of machine-readable medium/device for storing information. For example, the mass memory 1025 may represent a hard disk, a read-only or writeable optical CD, etc. The display controller 1020 controls, in a conventional manner, a display 1035, which may represent a cathode ray tube (CRT) display, a liquid crystal display (LCD), a plasma display, or other type of display device. The I/O controller 1030 controls I/O device(s) 1040, which may include one or more keyboards, mouse/track ball or other pointing devices, magnetic and/or optical disk drives, printers, scanners, digital cameras, microphones, etc.

The DPS 1000 represents only one example of a system, which may have many different configurations and architectures and which may be employed with the present invention. For example, Macintosh and Intel systems often have multiple busses, such as a peripheral bus, a dedicated cache bus, etc. On the other hand, a network computer, which may be used as a DPS of the present invention, may not include, for example, a hard disk or other mass storage device, but may receive routines and/or data from a network connection, such as the modem or interface 1045, to be processed by the processor 1005. Similarly, a Web TV system, which is known in the art, may be considered to be a DPS of the present invention, but such a system may not include one or more 110 devices, such as those described above with reference to I/O device 1040. Additionally, a portable communication and data processing system, which may employ a cellular telephone and/or paging capabilities, may be considered a DPS that may be used with the present invention.

In the system 1000 shown in FIG. 10, the mass memory 1025 (and/or the memory 1010) may store media (e.g. video, audio, movies, etc.) that may be processed according to the present invention. Alternatively, media data may be received by the DPS 1000, for example, via the modem or network interface 1045, and stored and/or presented by the display 1035 and/or the I/O device(s) 1040. In one embodiment, data may be transmitted across a data communication network, such as a LAN and/or the Internet.

It should be understood that the method and apparatus of the invention can be practiced with modification and alteration within the spirit and scope of the appended claims. The description is thus to be regarded as illustrative instead of limiting on the invention.

APPENDIX A

Section 1.
Sample code Illustrating implementation of Annotations in HTML
The definition of an Annotation class in Javascript:
annotPrefix="Quarksoup";
imageSuffix="Img";
// The specification of the Annot class . . .
// ind is an index
// t is an annotation type
// n is an index
// src1, and src2 are URLs that can be used in the specification of the annotation
// w is the width
// h is the height
function Annot (ind,t,n,src1,src2,w,h) {
    this.index=ind;

APPENDIX A-continued

```
    this.t=t;
    this.n=n;
    this.name=annotPrefix+"__"+t+"__"+n;
    this.normsrc=this.src=src1;
    this.selsrc=src2;
    this.selected=false;
    this.w=w;
    this.h=h;
    this.currentID='UNUSED';
    this.time=0;
    this.useImg=annotUseImg;
    this.HTML=annotHTML;
    this.setImgURL=annotSetImgURL;
    this.show=annotShow;
    this.hide=annotHide;
    this.click=annotClick;
    this.exclude=annotExclude;
    document.write(DivSt(this.name,-10000,-10000,w,h,0,0,0),
        this.HTML( ), DivEnd( ) );
        if (isIE4) this.img=document.images[this.name+imageSuffix];
        else {
            1=NSLayer(",this.name);
            this.img=(1?1.document.images[0]:null);
        }
}
```

Note that the code above actually creates DIV's in Internet Explorer, or LAYER's in Netscape through the DivSt( ) and DivEnd( ) calls. These DIV's or LAYER's contain the HTML code associated with each annotation object of this class.

Section 2.
This illustrates how the annotation containers are allocated on an HTML page
```
function initAnnot(nIcons, nLines, nRects) {
    arrAnnotations = new Array(nIcons+nLines+nRects);
    var i, j = 0;
    nFirstIndex[0] = j;
    for(i = 0; i < nIcons; i++, j++)
        arrAnnotations[j] = new Annot (j,0,i, annotImg, annotImg,
iconWidth, iconHeight);
    nLastIndex[0] = j−1; nFirstIndex[1] = j;
    for(i = 0; i < nLines; i++, j++)
        arrAnnotations[j] = new Annot (j,1,i, annotImg, annotImg, 1,
lineHeight);
    nLastIndex[1] = j−1; nFirstIndex[2] = j;
    for(i = 0; i < nRects; i++, j++)
        arrAnnotations[j] = new Annot (j,2,i, annotImg, annotImg, 1, 1);
    nLastIndex[2] = j−1;
    evnt = new astEvent(",",0,0,1,0,0,0,1,null,",",");
}
```

Note that in the above code we allocate an array of Annotation objects of 3 different types based on the Annot class defined above. These are the Annotation containers. The number of each type which are allocated is arbitrary and determined by the particular application.

Section 3.
This illustrates how to pick one of the annotation "containers" for use
```
function findAnnot(id) {
    // If any annotation has this ID, return it
    var i;
    for (i = 0; i < arrAnnotations.length; i++) {
        if (arrAnnotations[i] && arrAnnotations[i].currentID == id) {
            useAnnot(arrAnnotations[i], id);
            return arrAnnotations[i];
        }
    }
```

-continued

```
        return null;
}
function findUnusedAnnot (t, id) {
    // find the next unused annot, mark it as used return it
    var i;
    for (i = nFirstIndex[t]; i <= nLastIndex[t]; i++) {
        if (arrAnnotations[i] && arrAnnotations[i].currentID ==
        'UNUSED') {
            useAnnot(arrAnnotations[i], id);
            return arrAnnotations[i];
        }
    }
    return null;
}
function findOldestAnnot(t, id) {
    // find annotation with oldest usage date . . .
    varnOldest = -1;
    var d = new Date( );
    var tOldest = d.getTime( );
    var i;
    for (i = nFirstIndex[t]; i <= nLastIndex[t]; i++) {
        if (arrAnnotations[i] && arrAnnotations[i].time < tOldest) {
            tOldest = arrAnnotations[i].time;
            nOldest = i;
        }
    }
    if (nOldest > -1) {
        useAnnot(arrAnnotations[nOldest], id);
        return arrAnnotations[nOldest];
    }
    return null;
}
function getAnnot(t,id) {
    var an = findAnnot(id);
    if (!an) an = findUnusedAnnot(t, id);
    if (!an) an = findOldestAnnot(t, id);
    return an;
}
```

In the above code calling getAnnot( ) will find the next available container of type 't' and mark it as used with the identifier 'id'.

APPENDIX B

This illustrates how to change the HTML within an Annotation "container" function annotHTML( ) {
```
    var str = "";
    cl='clickAnnot('+this.index+');';
    if(this.t==0) {
        var attr = 'SRC="'+this.src+'" WIDTH="'+this.w+'"
        HEIGHT="'+this.h;
            var attr += '" BORDER="0"
            NAME="'+this.name+imageSuffix+'"';
        if (isIE4) str += '<IMG ' + attr +
        'onClick="'+cl+'">'
        else    str += '<A HREF="javascript:'+cl+'"><IMG ' +
        attr + '></A>'
    }
    else {
        var attr = 'SRC="tabletop.gif" WIDTH="3000"
        HEIGHT="3000" BORDER="0"';
        str = '<TABLE BACKGROUND="'+this.src;
            str += '"WIDTH=3000 HEIGHT=3000 BORDER=0
CELLSPACING=0 CELLPADDING=0><TR><TD>';
        if (isIE4) str += '<IMG' + attr + ' onClick="'+cl+'">'
        else    str += '<A HREF="javascript:'+cl+'"><IMG ' +
        attr + '><+/A>'
        str +='</TD></TR></TABLE>';
    }
    return str;
}
// end Annot class . . .
```

The above code generates a Javascript string which contains the HTML code that is inserted into the annotation container.

APPENDIX C

This Illustrates how to change an annotation's visibility, position and size
```
function annotShow(x,y,w,h) {
    if (this.t == 0) { w = this.w; h = this.h; x -= w/2; y -= h/2; }
    else if (this.t == 1) { this.w = w; h = this.h; }
    else if (this.t == 2) { this.w = w; this.h = h; }
    if (this.selected) {
        this.selected=false;
        this.useImg( );
    }
    evnt.init(this.name,"",0,0,1,VIZ|MOVE|CLIP|SIZE,x,y,1,new
    Array(0,0,w,h,w,h),"","","");
    evnt.ExecuteEvent( );
}
```

In the above code "evnt" is an Event object that operates on DIV's in Internet Explorer or LAYER's in Netscape and applies the desire properties to them. These properties include visibility, position, size and clipping.

APPENDIX D

This Illustrates how to associate a URL with a particular annotation
```
function annotUseImg( ) {
    this.src=this.selected?this.selsrc:this.normsrc;
    if (this.img) this.img.src=this.src;
    if (this.t!=0) {
        if(isIE4) {
            d=document.all[this.name];
            if (d) d.innerHTML=this.HTML( );
        }
        else {
            l=NSLayer('',this.name);
            if(l) { l.document.write(this.HTML( ));
            l.document.close( ); }
        }
    }
}
function annotSetImgURL(x,url) {
    var path = getAnnotImagePath( );
    if (path != '') url = path + getFName(url);
    if(x) this.selsrc=url;
    else this.normsrc=url;
    this.useImg( );
}
```

In the above example all of the URLs are used as images.

What is claimed is:

1. A method, implemented on a digital processing system, the method comprising:
    selecting presentation data, the presentation data having a first presentation command set associated therewith;
    issuing directive commands from a first digital processing system to at least one other digital processing system, which is remote from the first digital processing system, such that the at least one other digital processing system presents the presentation data; and
    issuing a second presentation command set from a digital processing system to the at least one other digital processing system such that the second presentation command set can be used to modify the first presentation command set such that the presentation of the presentation data is modified, without the at least one other digital processing system receiving the directive commands again.

2. The method of claim of 1, wherein the first presentation command set and the second presentation command set comprise Javascript.

3. The method of claim of 2, wherein the first presentation command set and the second presentation command set comprise hypertext data.

4. The method of claim 3, wherein said data is audio and/or video data.

5. The method of claim 4, wherein issuing directive commands further includes issuing URLs to an internet access means.

6. The method of claim 5, wherein said internet access means is a Web browser.

7. The method of claim of claim 1, wherein the second presentation command set is issued by the first digital processing system.

8. A machine-readable medium that provides executable instructions, which when executed by a digital processing system, cause the set of processors to perform a method comprising:

selecting presentation data, the presentation data having a first presentation command set associated therewith;

issuing directive commands from a first digital processing system to at least one other digital processing system, which is remote from the first digital processing system, such that the at least one other digital processing system presents the presentation data; and issuing a second presentation command set from a digital processing system to the at least one other digital processing system such that the second presentation command set can be used to modify the first presentation command set such that the presentation of the presentation data is modified, without the at least one other digital processing system receiving the directive commands again.

9. The machine readable medium of claim of 8 wherein the first presentation command set and the second presentation command set comprise Javascript.

10. The machine readable medium of claim of 8 wherein the first presentation command set and the second presentation command set comprise hypertext data.

11. The machine readable medium of claim 10, wherein said data is audio and/or video data.

12. The machine readable medium of claim 11, wherein issuing directive commands further includes issuing URLs to an internet access means.

13. The machine readable medium of claim 12, wherein said internet access means is a Web browser.

14. The machine readable medium of claim of claim 8 wherein the second presentation command set is issued by the first digital processing system.

15. An apparatus for modifying presentation data, said apparatus comprising:

means for selecting presentation data, the presentation data having a first presentation command set associated therewith;

means for issuing directive commands from a first digital processing system to at least one other digital processing system, which is remote from the first digital processing system, such that the at least one other digital processing system presents the presentation data; and means for issuing a second presentation command set from a digital processing system to the at least one other digital processing system such that the second presentation command set can be used to modify the first presentation command set such that the presentation of the presentation data is modified, without the at least one other digital processing system receiving the directive commands again.

16. The apparatus of claim of 15 wherein the first presentation command set and the second presentation command set comprise Javascript.

17. The apparatus of claim 16, wherein said data is audio and/or video data.

18. The apparatus of claim 17, wherein issuing directive commands further includes issuing URLs to an internet access means.

19. The apparatus of claim 18, wherein said internet access means is a Web browser.

20. The apparatus of claim of 15 wherein the first presentation command set and the second presentation command set comprise hypertext data.

21. The apparatus of claim of claim 15 wherein the second presentation command set is issued by the first digital processing system.

22. A method, implemented on a digital processing system, the method comprising:

receiving directive commands from a remote first digital processing system such that presentation data, having a first presentation command set associated therewith, is presented; and receiving a second presentation command set such that the second presentation command set can be used to modify the first presentation command set such that the presentation of the presentation data is modified, without receiving the directive commands again.

23. The method of claim of 22, wherein the first presentation command set and the second presentation command set comprise Javascript.

24. The method of claim of 23, wherein the first presentation command set and the second presentation command set comprise hypertext data.

25. The method of claim of claim 22, wherein the second presentation command set is received from the remote first digital processing system.

26. The method of claim 22, wherein said data is audio and/or video data.

27. The method of claim 22, wherein receiving directive commands further includes receiving URLs to an internet access means.

28. The method of claim 27, wherein said internet access means is a Web browser.

29. A machine-readable medium that provides executable instructions, which when executed by a digital processing system, cause the set of processors to perform a method comprising:

receiving directive commands from a remote first digital processing system such that presentation data, having a first presentation command set associated therewith, is presented; and receiving a second presentation command set such that the second presentation command set can be used to modify the first presentation command set such that the presentation of the presentation data is modified, without receiving the directive commands again.

30. The machine-readable medium of claim of 29, wherein the first presentation command set and the second presentation command set comprise Javascript.

31. The machine-readable medium of claim 30, wherein the first presentation command set and the second presentation command set comprise hypertext data.

32. The machine-readable medium of claim 29, wherein the second presentation command set is received from the remote first digital processing system.

33. The machine-readable medium of claim 29, wherein said data is audio and/or video data.

34. The machine-readable medium of claim 29, wherein receiving directive commands further includes receiving URLs to an internet access means.

35. The machine-readable medium of claim 34, wherein said internet access means is a Web browser.

36. An apparatus for modifying presentation data, said apparatus comprising:

means for receiving directive commands from a remote first digital processing system such that presentation data, having a first presentation command set associated therewith, is presented; and means for receiving a second presentation command set such that the second presentation command set can be used to modify the first presentation command set such that the presentation of the presentation data is modified, without receiving the directive commands again.

37. The apparatus of claim of 36, wherein the first presentation command set and the second presentation command set comprise Javascript.

38. The apparatus of claim of 37, wherein the first presentation command set and the second presentation command set comprise hypertext data.

39. The apparatus of claim of claim 36, wherein the second presentation command set is received from the remote first digital processing system.

40. The apparatus of claim 36, wherein said data is audio and/or video data.

41. The apparatus of claim 36, wherein receiving directive commands further includes receiving URLs to an internet access means.

42. The apparatus of claim 41, wherein said internet access means is a Web browser.

\* \* \* \* \*